US012561861B2

(12) United States Patent
Baughman et al.

(10) Patent No.: US 12,561,861 B2
(45) Date of Patent: Feb. 24, 2026

(54) DYNAMIC RESOURCE CONSTRAINT BASED SELECTIVE IMAGE RENDERING

(71) Applicant: International Business Machines Corporation, Armonk, NY (US)

(72) Inventors: Aaron K. Baughman, Cary, NC (US); Eduardo Morales, Key Biscayne, FL (US); Kavitha Hassan Yogaraj, Bangalore (IN); Rahul Agarwal, Jersey City, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 373 days.

(21) Appl. No.: 18/197,794

(22) Filed: May 16, 2023

(65) Prior Publication Data

US 2024/0386632 A1 Nov. 21, 2024

(51) Int. Cl.
*G06T 11/60* (2006.01)
*G06T 7/11* (2017.01)
(Continued)

(52) U.S. Cl.
CPC ................ *G06T 11/60* (2013.01); *G06T 7/11* (2017.01); *G06T 7/194* (2017.01); *G06T 9/002* (2013.01); *G06T 11/206* (2013.01); *H04N 19/94* (2014.11)

(58) Field of Classification Search
CPC . G06T 11/60; G06T 7/194; G06T 7/11; G06T 11/206; G06T 9/002; H04N 19/94
See application file for complete search history.

(56) References Cited

U.S. PATENT DOCUMENTS 6,915,011 B2 * 7/2005 Loui ...................... G06F 16/51
                                                382/173
6,954,500 B2 10/2005 Bottreau
                (Continued)

FOREIGN PATENT DOCUMENTS

CN       102089752 A     6/2011
CN       106504278 B     8/2019
                (Continued)

OTHER PUBLICATIONS

Mitra et al., Glance: A Generative Approach to Interactive Visualization of Voluminous Satellite Imagery, 2021 IEEE International Conference on Big Data (Big Data), Dec. 15-18, 2021.
                (Continued)

*Primary Examiner* — Michelle L Sams
(74) *Attorney, Agent, or Firm* — Garg Law Firm, PLLC; Rakesh Garg; Lily Neff

(57) ABSTRACT

Within a video frame, elements are identified. A graph is constructed for a portion of video content including the video frame. Using the graph and an excitement level corresponding to an element in the plurality of elements, the video frame is divided into an alterable region and an unalterable region. By solving an optimization problem, a compute resource and a rendering application are selected, the compute resource represented by a runtime feature vector encoding a plurality of features describing execution of the rendering application on the compute resource. Using the compute resource and the rendering application, a background image corresponding to the alterable region is rendered. The unalterable region and the background image are combined into a rendered video frame, the rendered video frame replacing the video frame within the portion of video content.

20 Claims, 6 Drawing Sheets

(51) Int. Cl.

| | | |
|---|---|---|
| *G06T 7/194* | (2017.01) | |
| *G06T 9/00* | (2006.01) | |
| *G06T 11/20* | (2006.01) | |
| *H04N 19/94* | (2014.01) | |

(56) References Cited

U.S. PATENT DOCUMENTS

| | | | | |
|---|---|---|---|---|
| 7,295,614 | B1 | 11/2007 | Shen et al. | |
| 7,418,116 | B2 * | 8/2008 | Fedorovskaya | G06F 16/58 |
| | | | | 707/E17.026 |
| 7,729,559 | B2 | 6/2010 | ORuanaidh et al. | |
| 8,457,422 | B2 | 6/2013 | Nakagami et al. | |
| 8,516,454 | B2 | 8/2013 | Mizrachi et al. | |
| 9,558,425 | B2 | 1/2017 | Wang et al. | |
| 10,123,065 | B2 | 11/2018 | Lyons et al. | |
| 10,552,714 | B2 | 2/2020 | Kiapour et al. | |
| 10,620,921 | B2 | 4/2020 | Brebner | |
| 10,719,742 | B2 | 7/2020 | Shechtman et al. | |
| 10,769,446 | B2 | 9/2020 | Chang et al. | |
| 11,024,009 | B2 | 6/2021 | Shi et al. | |
| 11,087,730 | B1 | 8/2021 | Wieder | |
| 11,373,405 | B2 | 6/2022 | Chang et al. | |
| 2003/0128389 | A1 * | 7/2003 | Matraszek | G06F 18/24 |
| | | | | 358/1.18 |
| 2005/0226317 | A1 | 10/2005 | Bottreau | |
| 2006/0008000 | A1 | 1/2006 | Ye et al. | |
| 2009/0080774 | A1 * | 3/2009 | Lin | G06V 10/26 |
| | | | | 382/176 |
| 2018/0336439 | A1 | 11/2018 | Kliger et al. | |
| 2021/0081677 | A1 * | 3/2021 | Wang | G06T 7/215 |

FOREIGN PATENT DOCUMENTS

| | | | |
|---|---|---|---|
| CN | 115345917 | A | 11/2022 |
| EP | 0540102 | A1 | 5/1993 |
| EP | 3404586 | A1 | 11/2018 |

OTHER PUBLICATIONS

Hoon et al., A Semantic Learning Approach for Mapping Unstructured Query to Web Resources, 2006 IEEE/WIC/ACM International Conference on Web Intelligence (WI 2006 Main Conference Proceedings)(WI'06), Dec. 18-22, 2006.

Wang et al., Remote Sensing Image Synthesis via Graphical Generative Adversarial Networks, IGARSS 2019—2019 IEEE International Geoscience and Remote Sensing Symposium, Jul. 28, 2019-Aug. 2, 2019.

Selgrad et al., Lightweight, generative variant exploration for high-performance graphics Applications, GPCE 2015: Proceedings of the 2015 ACM SIGPLAN International Conference on Generative Programming: Concepts and Experiences, pp. 141-150, Oct. 26, 2015.

Trujillo et al., Generative metaprogramming, GPCE '07: Proceedings of the 6th international conference on Generative programming and component engineering, pp. 105-114, Oct. 1, 2007.

Moreno, Creating custom containers with generative techniques, GPCE '06: Proceedings of the 5th international conference on Generative programming and component engineering, pp. 29-38, Oct. 22, 2006.

Corcoles et al., Exploiting Dynamic Quantum Circuits in a Quantum Algorithm with Superconducting Qubits, Physical Review Letters, Feb. 2, 2021.

Fu et al., Temporal consistency enhancement on depth sequences, 28th Picture Coding Symposium, Dec. 8-10, 2010.

Seran et al., New Temporal Filtering Scheme to Reduce Delay in Wavelet-Based Video Coding, IEEE Transactions on Image Processing, vol. 16, No. 12, Dec. 2007.

Computational Creativity Market, Computational Creativity Market by Component (Solutions and Services), Technology, Application (Marketing & Web Designing, Product Designing, Music Composition, Photography & Videography, Automated Story Generation), and Region—Global Forecast to 2023, Nov. 2018.

Corcoles et al., Exploiting Dynamic Quantum Circuits in a Quantum Algorithm with Superconducting Qubits, Physical Review Letters, Aug. 31, 2021.

* cited by examiner

Figure 2:
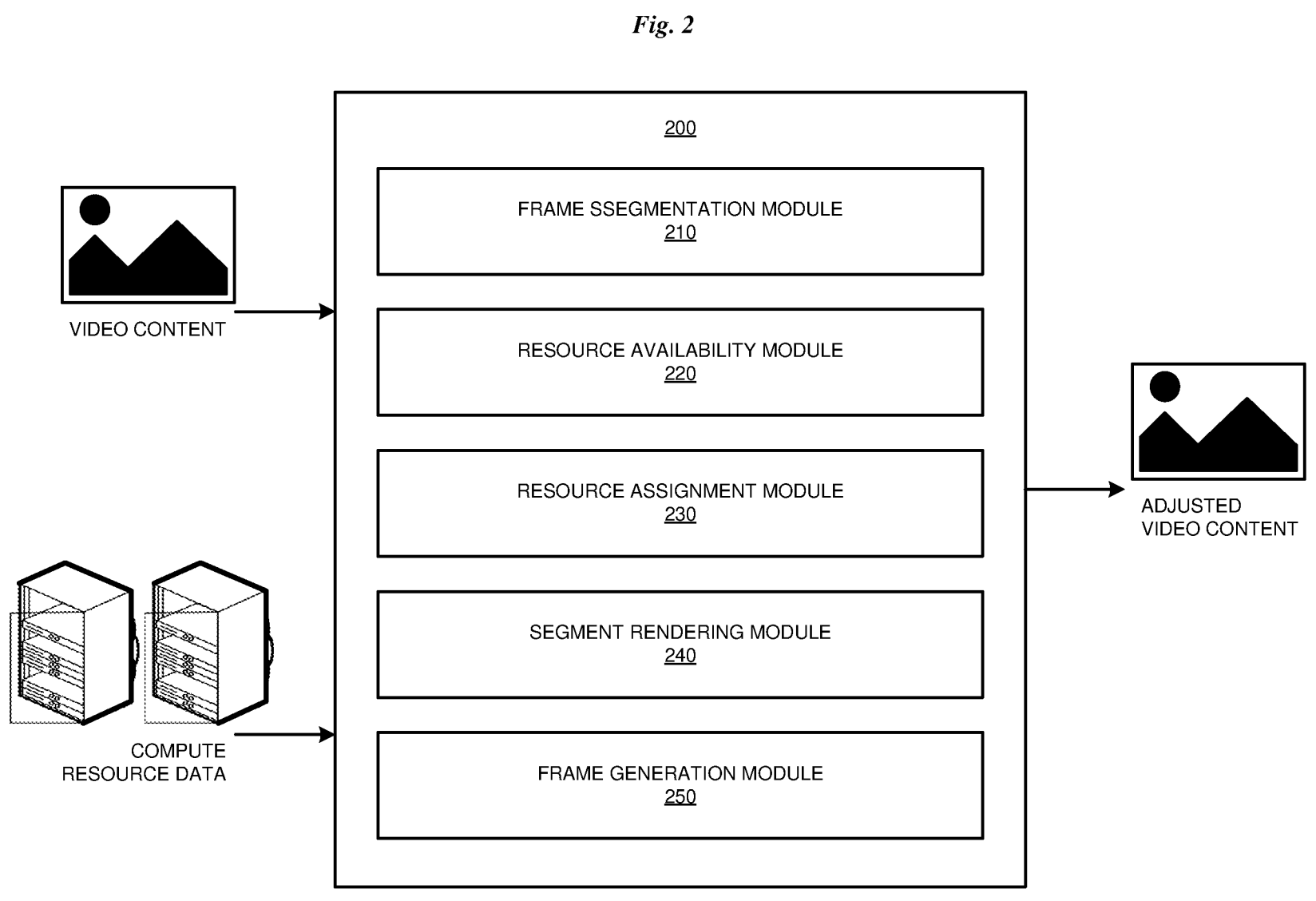

FRAME SSEGMENTATION MODULE
210

RESOURCE AVAILABILITY MODULE
220

RESOURCE ASSIGNMENT MODULE
230

SEGMENT RENDERING MODULE
240

FRAME GENERATION MODULE
250

VIDEO CONTENT

COMPUTE RESOURCE DATA

ADJUSTED VIDEO CONTENT

DYNAMIC RESOURCE CONSTRAINT BASED SELECTIVE IMAGE RENDERING

BACKGROUND

The present invention relates generally to a method, system, and computer program product for image rendering. More particularly, the present invention relates to a method, system, and computer program product for dynamic resource constraint based selective image rendering.

In computing, a resource constraint is a limitation on a capability that degrades a user's experience or the performance of an automated process. Because, to be perceived as video, individual video frames must be presented using at least a specific frame rate (e.g., 30 frames/second), if the contents of individual frames are not ready when required due to resource constraints, the quality of computer graphics, and thus a user's experience when consuming graphical content (such as video and games), will be degraded. For example, in some applications, graphics and video are generated on a remote system and sent to a local system where a user consumes the generated content. However, because a network lag could delay graphics sent from a remote system, for the best user experience graphics-intensive games often require a local system with sufficient graphics generation capacity. On the other hand, local memory swapping locally rendered graphics can become pixelated or a rendering flow can become too slow. Some systems attempt to compensate for network or system delays by reducing the number of pixels generated (locally or remotely, but this reduces the resolution of the generated graphics. A computer system used to generate, or render, computer graphics or video is referred to herein as a compute resource, rendering resource, or simply a resource (unless expressly disambiguated).

Vector graphics is a form of computer graphics in which visual images are created directly from geometric shapes defined on a Cartesian plane, such as points, lines, curves and polygons. In contrast, raster graphics is a form of computer graphics in which visual images are created from a rectangular matrix or grid of square pixels. Often, the two forms are combined. For example, a rendering application might generate a set of polygons representing an object to be displayed (vector graphics), then map visible portions of the polygons to specific pixels of a display (raster graphics).

SUMMARY

The illustrative embodiments provide a method, system, and computer program product. An embodiment includes a method that identifies, within a video frame, a plurality of elements. An embodiment constructs, for a portion of video content including the video frame, a graph, a node in the graph representing an element in the plurality of elements, an edge in the graph representing an interaction between two elements in the plurality of elements. An embodiment divides, into an alterable region and an unalterable region, using the graph and an excitement level corresponding to an element in the plurality of elements, the video frame. An embodiment selects, by solving an optimization problem, a compute resource and a rendering application, the compute resource represented by a runtime feature vector encoding a plurality of features describing execution of the rendering application on the compute resource. An embodiment renders, using the compute resource and the rendering application, a background image corresponding to the alterable region. An embodiment combines, into a rendered video frame, the unalterable region and the background image, the rendered video frame replacing the video frame within the portion of video content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 2 depicts a block diagram of an example configuration for dynamic resource constraint based selective image rendering in accordance with an illustrative embodiment;

DETAILED DESCRIPTION

Figure 1:
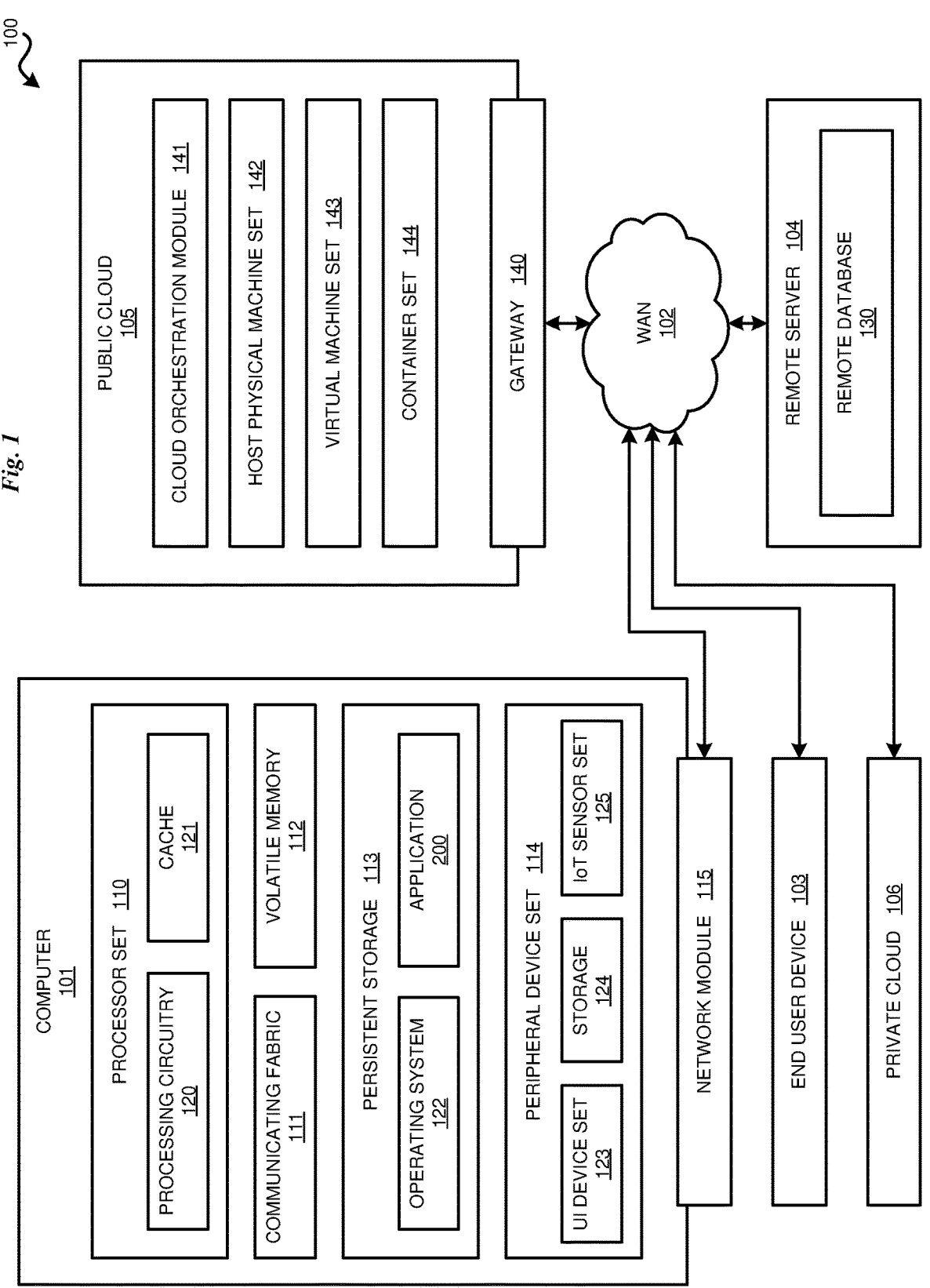
FIG. 1 depicts an example diagram of a data processing environments in which illustrative embodiments may be implemented.

The illustrative embodiments recognize that available resources, and associated resource constraints, for rendering video vary. For example, at one time a user might play a game on a mobile device that is unable to render the game's graphics sufficiently quickly, thus requiring the graphics to be rendered remotely and sent to the mobile device over a network. At another time the user might watch a movie-a task that can be performed locally-on the mobile device. At a third time the user might play the game on a sufficiently powerful system, using locally generated graphics, and at a fourth time a remote compute resource might be unavailable for use. At a fifth time, a remote rendering application might be unavailable, necessitating substitution of a different remote or local rendering application. In addition, there may be different costs (e.g., in time, money, effect on other applications, and the like) associated with performing rendering on different compute resources. As well, different portions of video content, and different portions of still images within the content, might have different rendering needs. For example, a scene in which two people sit at a conference room table might require a less powerful compute resource than a scene in which multiple computer-generated spaceships fight a space battle, and a scene with a simple background (e.g., a plain office wall) might require a less powerful compute resource than a scene with a more complex background (e.g., a busy street with cars, pedestrians, wind-blown trees, and other moving elements). Thus, the illustrative embodiments recognize that there is a need to provide graphics and video, using available compute resources, that meet cost and user experience quality requirements, given dynamically changing compute resources, rendering applications, network conditions, and other factors.

The illustrative embodiments recognize that the presently available tools or solutions do not address these needs or provide adequate solutions for these needs. The illustrative embodiments used to describe the invention generally address and solve the above-described problems and other problems related to dynamic resource constraint based selective image rendering.

An embodiment can be implemented as a software application. The application implementing an embodiment can be configured as a modification of an existing image rendering system, as a separate application that operates in conjunction with an existing image rendering system, a standalone application, or some combination thereof.

Particularly, some illustrative embodiments provide a method that identifies a plurality of elements within a video frame, constructs a graph for a portion of video content including the video frame, selects a compute resource and a rendering application, uses the compute resource and the rendering application to render a background image corresponding to an alterable region of the video frame, and combines the unalterable region and the background image into a rendered video frame.

An embodiment receives a portion of video content, including one or more video frames. An embodiment uses a presently available object recognition technique to identify a plurality of elements within a video frame of the portion. For example, in video of a sailboat on the ocean, some of the identified elements might include each sail and the boat's hull. As another example, in video of a basketball game, some of the identified elements might include the ball, hoop, and arm, leg, torso, and head portions of players depicted in the frame.

An embodiment uses the video frame, as well as the portion of video content in which the video frame is included or one or more user selected portions of video content, to identify interactions, or causal relationships, between the identified elements in the frame. One embodiment uses the video frame and the four immediately previous frames to identify interactions between elements. For example, an embodiment might determine that there is an interaction between a player's hand (one element) and a basketball (another element), because the player threw the basketball two frames prior. As another example, an embodiment might determine that there is an interaction between the hull (one element) and two sails (each elements) of a sailboat, because they all move as a unit on the ocean. Techniques, such as object/attach/intent detection techniques, are presently available to identify interactions between elements.

An embodiment uses a presently available technique to compute an excitement level corresponding to an identified element. An excitement level is determined based on the subject matter domain (e.g., a particular televised sport) and use case (e.g., a televised sport, a music concert, an electronic game in which all of the depicted action is virtual). Some non-limiting examples of techniques used in computing an excitement level include gesture recognition (e.g., spectators pointing at a basketball during a basketball game), eye movement recognition (e.g., spectators tracking a basketball as it flies towards a basket, or an individual gamer's area of focus), sound levels and word recognition (e.g., cheers or boos and their volume), using data derived from biometric parameters (e.g., a gamer's heart rate, blood pressure, or amount of sweat), and the like.

An embodiment constructs a graph in which a node represents an identified element in the video frame and an edge represents an interaction between two elements represented by nodes. One embodiment uses a presently available technique to use the graph to identify interactions, or causal relationships, between the identified elements in the frame, and adds the additional interactions to the graph. One embodiment stores an excitement level associated with an element in data of a node representing the element. In one embodiment, the graph is a directed acyclic graph (DAG). In a directed graph, each edge has an orientation or direction, from one node to another. A path in a directed graph is a sequence of edges in which the ending node of each edge in the sequence is the same as the starting node of the next edge in the sequence. A path forms a cycle if the starting node of the path's first edge equals the ending node of the path's last edge. A DAG is a directed graph that has no cycles.

An embodiment segments identified elements in the video frame into a plurality of tiers. One embodiment uses an element's level (i.e., distance from the root node) in the DAG topology to assign the element to a tier. Another embodiment uses an element's excitement level to assign the element to a tier, for example with an element having the highest excitement level assigned to the highest tier and elements having lower excitement levels assigned to correspondingly lower tiers. Another embodiment uses a combination of an element's DAG topology level and excitement level to assign the element to a tier.

An embodiment uses the DAG and an excitement level corresponding to an element to divide the video frame into an alterable region and an unalterable region. One embodiment divides the video frame into an alterable region and an unalterable region according to elements' tiers. In one embodiment, the unalterable region is a foreground region of the video frame (e.g., a ball in a game, a sailboat in an ocean, or other region that appears to be attracting excitement or attention) and the alterable region is a background region of the video frame (e.g., the spectators behind the ball in the game, the ocean and sky behind the sailboat).

An embodiment has access to, and receives data of, a plurality of compute resources which could be used to render graphics into the video frame. The compute resources include a user's local system, as well as (optionally) one or more remote systems accessible from the local system via a network. An embodiment also has access to, and receives data of, a plurality of rendering applications which, when executing on a compute resource, could be used to render graphics into the video frame. In one embodiment, code from one rendering application is transpiled into another rendering application that is executable in a different processor architecture, using a different operating system, or in a different execution environment from that of the original rendering application.

An embodiment encodes a plurality of features of a compute resource into a resource feature vector. A feature vector is a multidimensional number that represents a point in a multidimensional feature space. Some non-limiting examples of features of a compute resource are network bandwidth (if the resource is not a user's local system), processor type and speed, graphics processor type and speed (if available), tensor processing unit (a processor used to accelerate processing of machine learning workloads) availability, quantum processing unit (a processor using quantum computing to accelerate processing) availability, free memory, available storage, and the like. An embodiment encodes a plurality of features of a rendering application into a code feature vector. Some non-limiting examples of features of a rendering application are the type of code, the number of lines of code to be executed to perform the rendering, a complexity of the code, and the like. An embodiment combines the code feature vector and resource feature vectors of each available compute resource into a combined feature vector. One embodiment combines feature vectors by concatenating them in a specified order and adding padding if necessary.

An embodiment uses a trained feedforward neural network (FNN) to generate a runtime feature vector from the combined feature vector. An FNN is an artificial neural network in which information moves in only one direction, forward, from the input nodes, through the hidden nodes (if any) and to the output nodes. The runtime feature vector encodes a plurality of features describing execution of a rendering application on a compute resource. Some non-limiting examples of features describing execution of a rendering application on a compute resource are the location of a rendering resource relative to a user (i.e., remote or local), the type of recursion, and the depth of recursion. Recursion, as used herein, refers to repetitively or recursively regenerating a portion of an image at successively higher resolutions. The type of recursion refers to head recursion (i.e., generating multiple versions of the image portion in parallel with each other), tail recursion (i.e., generating multiple versions of the image portion in series with each other), or a hybrid of head and tail recursion. The depth of recursion refers to the number of versions of the image portion that are generated. The FNN is trained before use, using training data appropriate to an embodiment's subject matter domain or use case. One embodiment uses a plurality of FNNs, in parallel with each other, to generate a plurality of runtime feature vectors, each encoding a different combination of features describing execution of a rendering application on a compute resource. Another embodiment uses a trained recurrent neural network, instead of an FNN, to generate a runtime feature vector from the combined feature vector. Another embodiment uses a use case-specific mathematical formula to generate a runtime feature vector from the combined feature vector. An embodiment periodically repeats generation of one or more runtime feature vectors, to account for changing network conditions, changing availability of compute resources and rendering applications, and other factors. One embodiment repeats generation of one or more runtime feature vectors every five video frames. Other time periods between runtime feature vectors are also possible and contemplated within the illustrative embodiments.

An embodiment uses a presently available technique to select a compute resource and a rendering application from those the embodiment has access to. In particular, an embodiment solves an optimization problem to select a compute resource and a rendering application with features that do one or more of maximizing the recursive depth (thus generating an image portion with as high a resolution as possible), minimizing the compute load of generating an image portion, avoiding resource lags (e.g., by avoiding selecting a remote compute resource if a network latency is too high to receive results from the remote resource sufficiently timely), minimize the amount of generated graphical elements (such as polygons), minimizing the number of times a rendering application is executed (e.g., if code can execute on both a processor and a graphics process, selecting only one location), and the like.

An embodiment uses the selected compute resource and rendering application to render a background image corresponding to the alterable region of the video frame. In one embodiment, the background image is in a vector graphics format.

An embodiment combines the background image and the unalterable region of the video frame into a rendered video frame, and replaces the original video frame with the rendered video frame in the portion of video content in which the original video frame was included. One embodiment uses a generative adversarial network (GAN) to combine the background image and the unalterable region of the video frame into a rendered video frame. A GAN is a presently available technique that includes a generative network that generates output candidates (e.g., output images) and a discriminative network that evaluates whether an output candidate is real or generated. If an embodiment is implementing head recursion, the embodiment uses a plurality of GANs, configured in parallel with each other, to generate a plurality of rendered video frames with different resolutions of the image in the generated portion, then combines the plurality of rendered video frames into one final rendered video frame. If an embodiment is implementing tail recursion, the embodiment uses a plurality of GANs, configured in series with each other, to generate a series of rendered video frames, each incorporating an output of the next GAN in the series. If an embodiment is implementing a hybrid of head and tail recursion, the embodiment generates a required number of frames from a combination of head and tail recursion techniques, head first then tail or vice-versa. In addition, head, tail, or hybrid recursion can be used more than once to generate different portions of a frame to be combined at a later processing stage. Another embodiment uses an autoencoder, another presently available technique that generates an image from an existing image, in place of one or more GANs. Other image generation techniques are usable in place of one or more GANs, and are contemplated within the scope of the illustrative embodiments.

The manner of dynamic resource constraint based selective image rendering described herein is unavailable in the presently available methods in the technological field of endeavor pertaining to still image and video rendering. A method of an embodiment described herein, when implemented to execute on a device or data processing system, comprises substantial advancement of the functionality of that device or data processing system in identifying a plurality of elements within a video frame, constructing a graph for a portion of video content including the video frame, selecting a compute resource and a rendering application, using the compute resource and the rendering application to render a background image corresponding to an alterable region of the video frame, and combining the unalterable region and the background image into a rendered video frame.

The illustrative embodiments are described with respect to certain types of feature vectors, compute resources, rendering applications, excitement levels, contents, delays, FNNs, GANs, artificial neural networks, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a dynamic resource constraint based selective image rendering embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. In addition, a compute resource used by application 200 can be any of computer 101, end user device 103, remote server 104, or a computer in public cloud 105 or private cloud 106, or another system.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104 in response to a request, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

With reference to FIG. 2, this figure depicts a block diagram of an example configuration for dynamic resource constraint based selective image rendering in accordance with an illustrative embodiment. Application 200 is the same as application 200 in FIG. 1.

Frame segmentation module 210 receives a portion of video content, including one or more video frames. Module 210 uses a presently available object recognition technique to identify a plurality of elements within a video frame of the portion. For example, in video of a sailboat on the ocean, some of the identified elements might include each sail and the boat's hull. As another example, in video of a basketball game, some of the identified elements might include the ball, hoop, and arm, leg, torso, and head portions of players depicted in the frame.

Module 210 uses the video frame, as well as the portion of video content in which the video frame is included or one or more user selected portions of video content, to identify interactions, or causal relationships, between the identified elements in the frame. One implementation of module 210 uses the video frame and the four immediately previous frames to identify interactions between elements. For example, module 210 might determine that there is an interaction between a player's hand (one element) and a basketball (another element), because the player threw the basketball two frames prior. As another example, module 210 might determine that there is an interaction between the hull (one element) and two sails (each elements) of a sailboat, because they all move as a unit on the ocean. Techniques, such as object/attach/intent detection techniques, are presently available to identify interactions between elements.

Module 210 uses a presently available technique to compute an excitement level corresponding to an identified element. An excitement level is determined based on the subject matter domain (e.g., a particular televised sport) and use case (e.g., a televised sport, a music concert, an electronic game in which all of the depicted action is virtual). Some non-limiting examples of techniques used in computing an excitement level include gesture recognition (e.g., spectators pointing at a basketball during a basketball game), eye movement recognition (e.g., spectators tracking a basketball as it flies towards a basket, or an individual gamer's area of focus), sound levels and word recognition (e.g., cheers or boos and their volume), using data derived from biometric parameters (e.g., a gamer's heart rate, blood pressure, or amount of sweat), and the like.

Module 210 constructs a graph in which a node represents an identified element in the video frame and an edge represents an interaction between two elements represented by nodes. One implementation of module 210 uses a presently available technique to use the graph to identify interactions, or causal relationships, between the identified elements in the frame, and adds the additional interactions to the graph. One implementation of module 210 stores an excitement level associated with an element in data of a node representing the element. In one implementation of module 210, the graph is a DAG.

Module 210 segments identified elements in the video frame into a plurality of tiers. One implementation of module 210 uses an element's level (i.e., distance from the root node) in the DAG topology to assign the element to a tier. Another implementation of module 210 uses an element's excitement level to assign the element to a tier, for example with an element having the highest excitement level assigned to the highest tier and elements having lower excitement levels assigned to correspondingly lower tiers. Another implementation of module 210 uses a combination of an element's DAG topology level and excitement level to assign the element to a tier.

Module 210 uses the DAG and an excitement level corresponding to an element to divide the video frame into an alterable region and an unalterable region. One implementation of module 210 divides the video frame into an alterable region and an unalterable region according to elements' tiers. In one implementation of module 210, the unalterable region is a foreground region of the video frame (e.g., a ball in a game, a sailboat in an ocean, or other region that appears to be attracting excitement or attention) and the alterable region is a background region of the video frame (e.g., the spectators behind the ball in the game, the ocean and sky behind the sailboat).

Resource availability module 220 has access to, and receives data of, a plurality of compute resources which could be used to render graphics into the video frame. The compute resources include a user's local system, as well as (optionally) one or more remote systems accessible from the local system via a network. Module 220 also has access to, and receives data of, a plurality of rendering applications which, when executing on a compute resource, could be used to render graphics into the video frame. In one implementation of module 220, code from one rendering application is transpiled into another rendering application that is executable in a different processor architecture, using a different operating system, or in a different execution environment from that of the original rendering application.

Module 220 encodes a plurality of features of a compute resource into a resource feature vector. Some non-limiting examples of features of a compute resource are network bandwidth (if the resource is not a user's local system), processor type and speed, graphics processor type and speed (if available), tensor processing unit (a processor used to accelerate processing of machine learning workloads) availability, quantum processing unit (a processor using quantum computing to accelerate processing) availability, free memory, available storage, and the like. Module 220 encodes a plurality of features of a rendering application into a code feature vector. Some non-limiting examples of features of a rendering application are the type of code, the number of lines of code to be executed to perform the rendering, a complexity of the code, and the like. Module 220 combines the code feature vector and resource feature vectors of each available compute resource into a combined feature vector. One implementation of module 220 combines feature vectors by concatenating them in a specified order and adding padding if necessary.

Module 220 uses a trained FNN to generate a runtime feature vector from the combined feature vector. The runtime feature vector encodes a plurality of features describing execution of a rendering application on a compute resource. Some non-limiting examples of features describing execution of a rendering application on a compute resource are the location of a rendering resource relative to a user (i.e., remote or local), the type of recursion, and the depth of recursion. The FNN is trained before use, using training data appropriate to an embodiment's subject matter domain or use case. One implementation of module 220 uses a plurality of FNNs, in parallel with each other, to generate a plurality of runtime feature vectors, each encoding a different combination of features describing execution of a rendering application on a compute resource. Another implementation of module 220 uses a trained recurrent neural network, instead of an FNN, to generate a runtime feature vector from the combined feature vector. Another implementation of module 220 uses a use case-specific mathematical formula to generate a runtime feature vector from the combined feature vector. Module 220 periodically repeats generation of one or more runtime feature vectors, to account for changing network conditions, changing availability of compute resources and rendering applications, and other factors. One implementation of module 220 repeats generation of one or more runtime feature vectors every five video frames. Other time periods between runtime feature vectors are also possible.

Resource assignment module 230 uses a presently available technique to select a compute resource and a rendering application from those application 200 has access to. In particular, module 230 solves an optimization problem to select a compute resource and a rendering application with features that do one or more of maximizing the recursive depth (thus generating an image portion with as high a resolution as possible), minimizing the compute load of generating an image portion, avoiding resource lags (e.g., by avoiding selecting a remote compute resource if a network latency is too high to receive results from the remote resource sufficiently timely), minimize the amount of generated graphical elements (such as polygons), minimizing the number of times a rendering application is executed (e.g., if code can execute on both a processor and a graphics process, selecting only one location), and the like.

Segment rendering module 240 uses the selected compute resource and rendering application to render a background image corresponding to the alterable region of the video frame. In one implementation of module 240, the background image is in a vector graphics format.

Frame generation module 250 combines the background image and the unalterable region of the video frame into a rendered video frame, and replaces the original video frame with the rendered video frame in the portion of video content in which the original video frame was included. One implementation of module 250 uses a GAN to combine the background image and the unalterable region of the video frame into a rendered video frame. If module 250 is implementing head recursion, module 250 uses a plurality of GANs, configured in parallel with each other, to generate a plurality of rendered video frames with different resolutions of the image in the generated portion, then combines the plurality of rendered video frames into one final rendered video frame. If module 250 is implementing tail recursion, module 250 uses a plurality of GANs, configured in series with each other, to generate a series of rendered video frames, each incorporating an output of the next GAN in the series. If module 250 is implementing a hybrid of head and tail recursion, module 250 generates a required number of frames from a combination of head and tail recursion techniques, head first then tail or vice-versa. In addition, head, tail, or hybrid recursion can be used more than once to generate different portions of a frame to be combined at a later processing stage.

Figure 3:
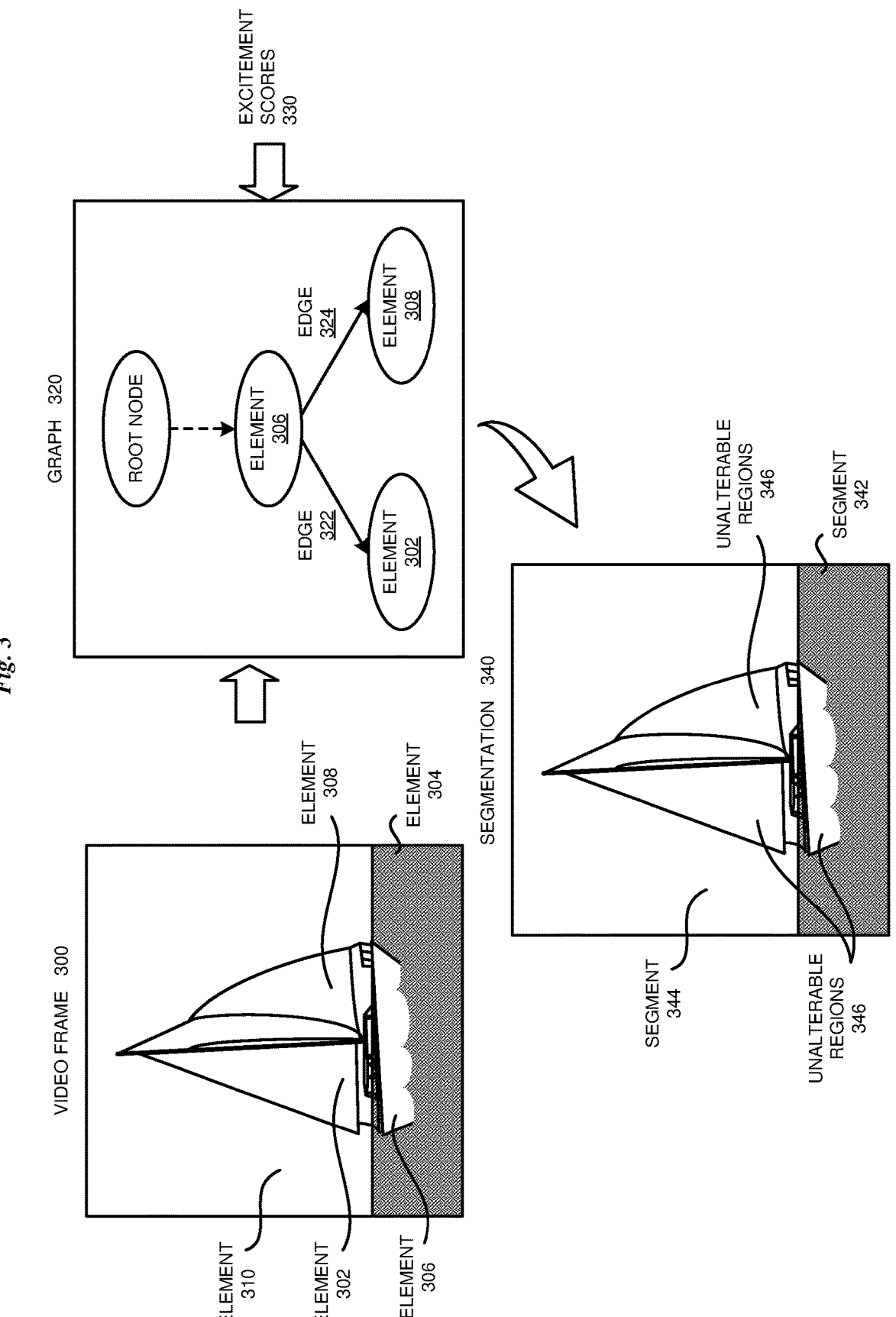
FIG. 3 depicts an example of dynamic resource constraint based selective image rendering in accordance with an illustrative embodiment.

With reference to FIG. 3, this figure depicts an example of dynamic resource constraint based selective image rendering in accordance with an illustrative embodiment. The example can be executed using application 200 in FIG. 2.

Frame segmentation module 210 receives a portion of video content, including video frame 300. Module 210 uses a presently available object recognition technique to identify elements 302, 304, 306, 308, and 310 within video frame 300.

Module 210 uses video frame 300, as well as the portion of video content in which video frame 300 is included, to identify interactions, or causal relationships, between the identified elements in the frame. Module 210 also uses a presently available technique to compute excitement scores 330, excitements level corresponding to one or more of elements 302, 304, 306, 308, and 310.

Module 210 constructs graph 320, a DAG in which a node represents an identified element in the video frame (e.g., elements 306, 302, and 308) and an edge (e.g., edges 322 and 324) represents an interaction between two elements represented by nodes.

Module 210 uses graph 320 and an excitement level corresponding to an element (within excitement scores 330) to divide video frame 300 into segments 342 and 344 (alterable regions) and unalterable regions 346. The results are depicted in segmentation 340.

Figure 4:
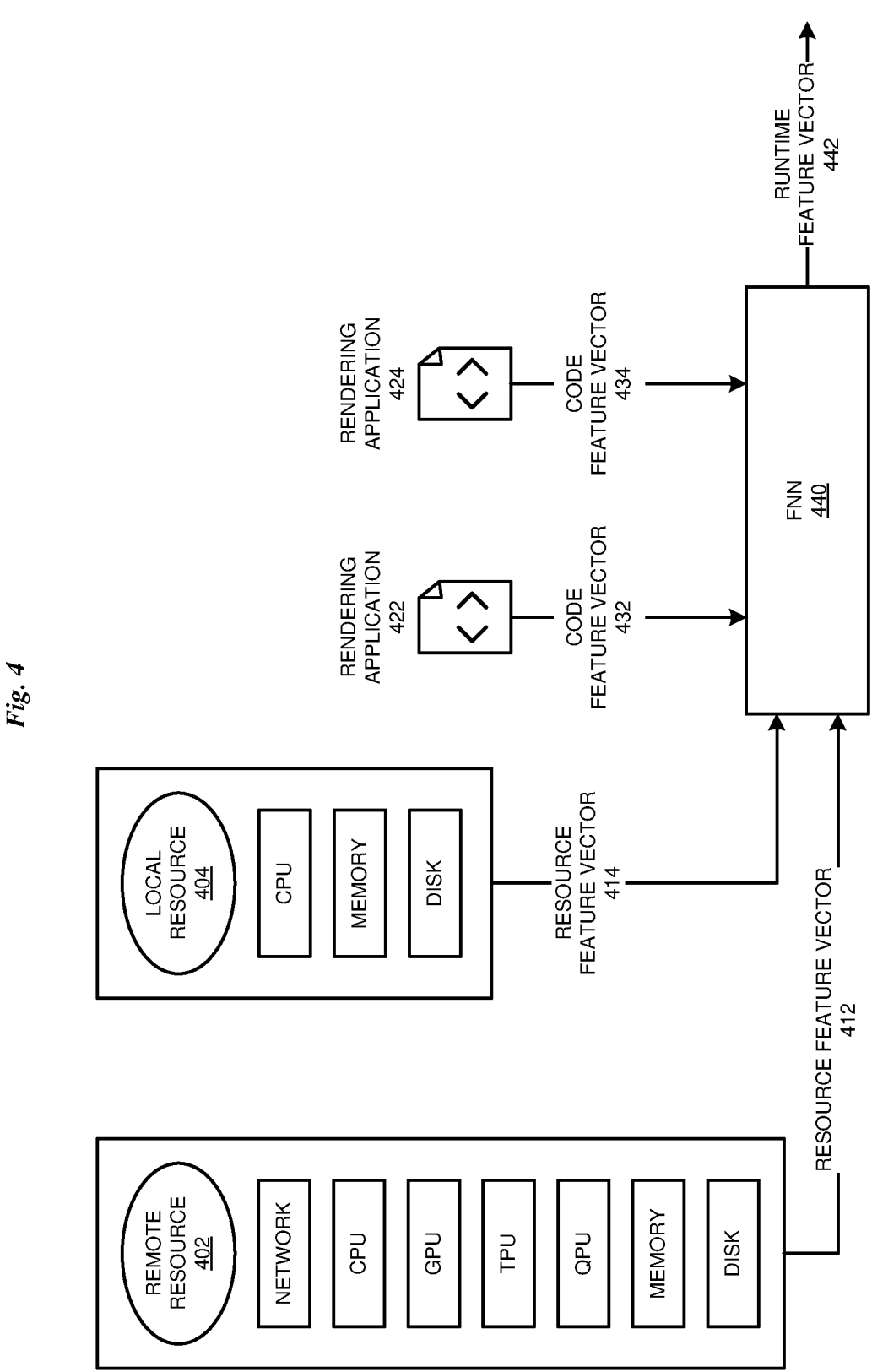
FIG. 4 depicts a continued example of dynamic resource constraint based selective image rendering in accordance with an illustrative embodiment.

With reference to FIG. 4, this figure depicts a continued example of dynamic resource constraint based selective image rendering in accordance with an illustrative embodiment.

Resource availability module 220 has access to, and receives data of, a plurality of compute resources (including remote resource 402 and local resource 404) which could be used to render graphics into the video frame. Module 220 also has access to, and receives data of, a plurality of rendering applications (including rendering applications 422 and 424) which, when executing on a compute resource, could be used to render graphics into the video frame.

Module 220 encodes a plurality of features of remote resource 402 into resource feature vector 412, and encodes a plurality of features of local resource 404 into resource feature vector 414. Module 220 encodes a plurality of features of rendering application 422 into code feature vector 432, and encodes a plurality of features of rendering application 424 into code feature vector 434. Module 220 uses FNN 440 to generate runtime feature vector 442 from a combination of feature vectors 412, 414, 432, and 434.

Figure 5:
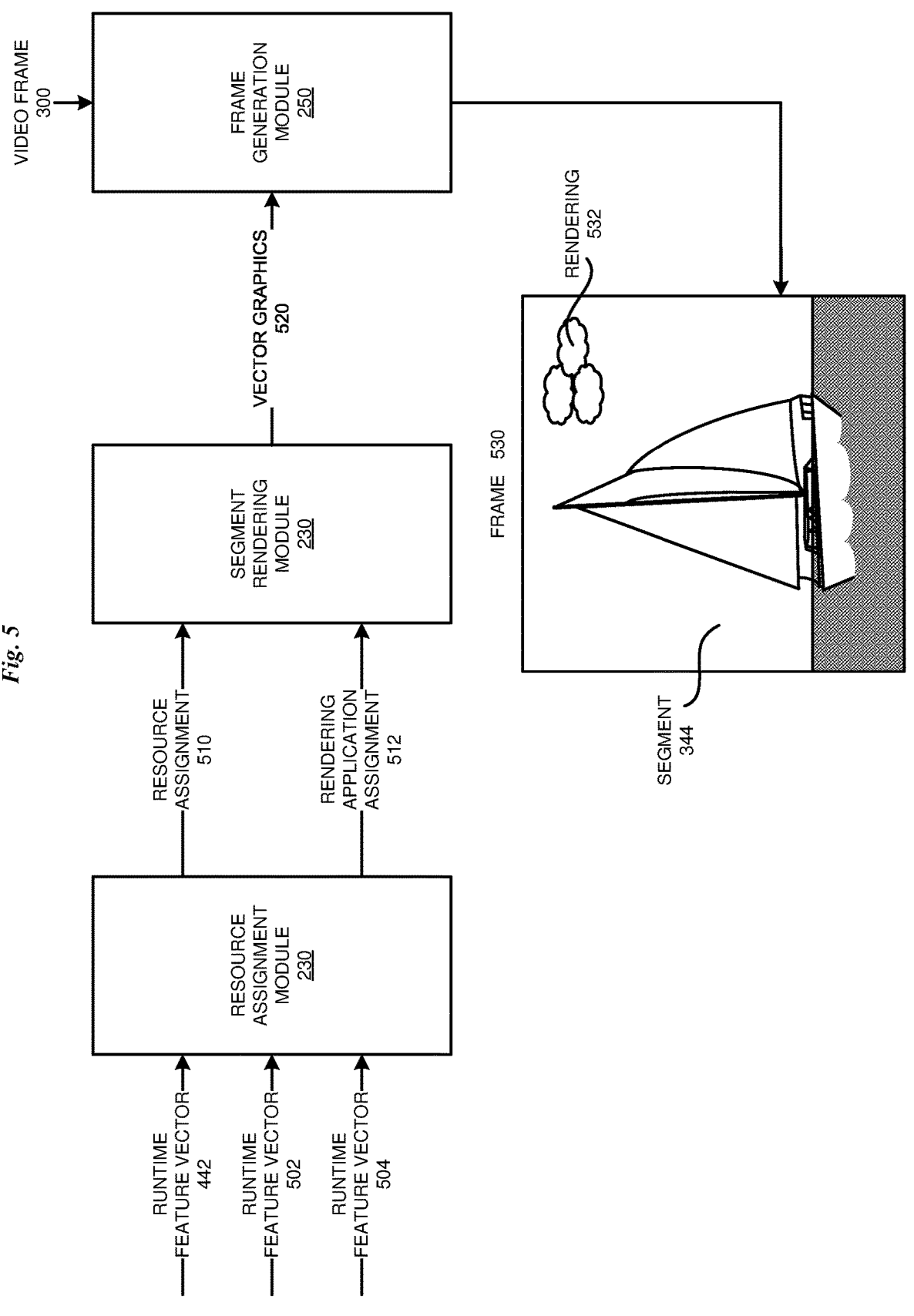
FIG. 5 depicts a continued example of dynamic resource constraint based selective image rendering in accordance with an illustrative embodiment.

With reference to FIG. 5, this figure depicts a continued example of dynamic resource constraint based selective image rendering in accordance with an illustrative embodiment. Resource assignment module 230, segment rendering module 240, and frame generation module 250 are the same as resource assignment module 230, segment rendering module 240, and frame generation module 250 in FIG. 2. Video frame 300 is the same as video frame 300 in FIG. 3. Runtime feature vector 442 is the same as runtime feature vector 442 in FIG. 4.

Resource assignment module 230 uses a presently available technique to select a compute resource (resource assignment 510) and a rendering application (rendering application assignment 512) from runtime feature vectors 442, 502, and 504, each encoding a different combination of features describing execution of a rendering application on a compute resource. Segment rendering module 240 uses resource assignment 510 and rendering application assignment 512 to generate vector graphics 520, a background image corresponding to an alterable region of video frame 300. Frame generation module 250 combines vector graphics 520 and the unalterable regions of video frame 300 into frame 530. In particular, rendering 532 (generated from vector graphics 520) has been inserted into segment 344. Note that rendering 532 is only a simple example, and rendering 532 could instead have included a higher-resolution version of the sky portion of video frame 300, a status display (e.g., lane markings or timing information, if the sailboat depicted in video frame 300 is part of a sailboat race), inserted or removed depictions of spectators or other boats, or another depiction.

Figure 6:
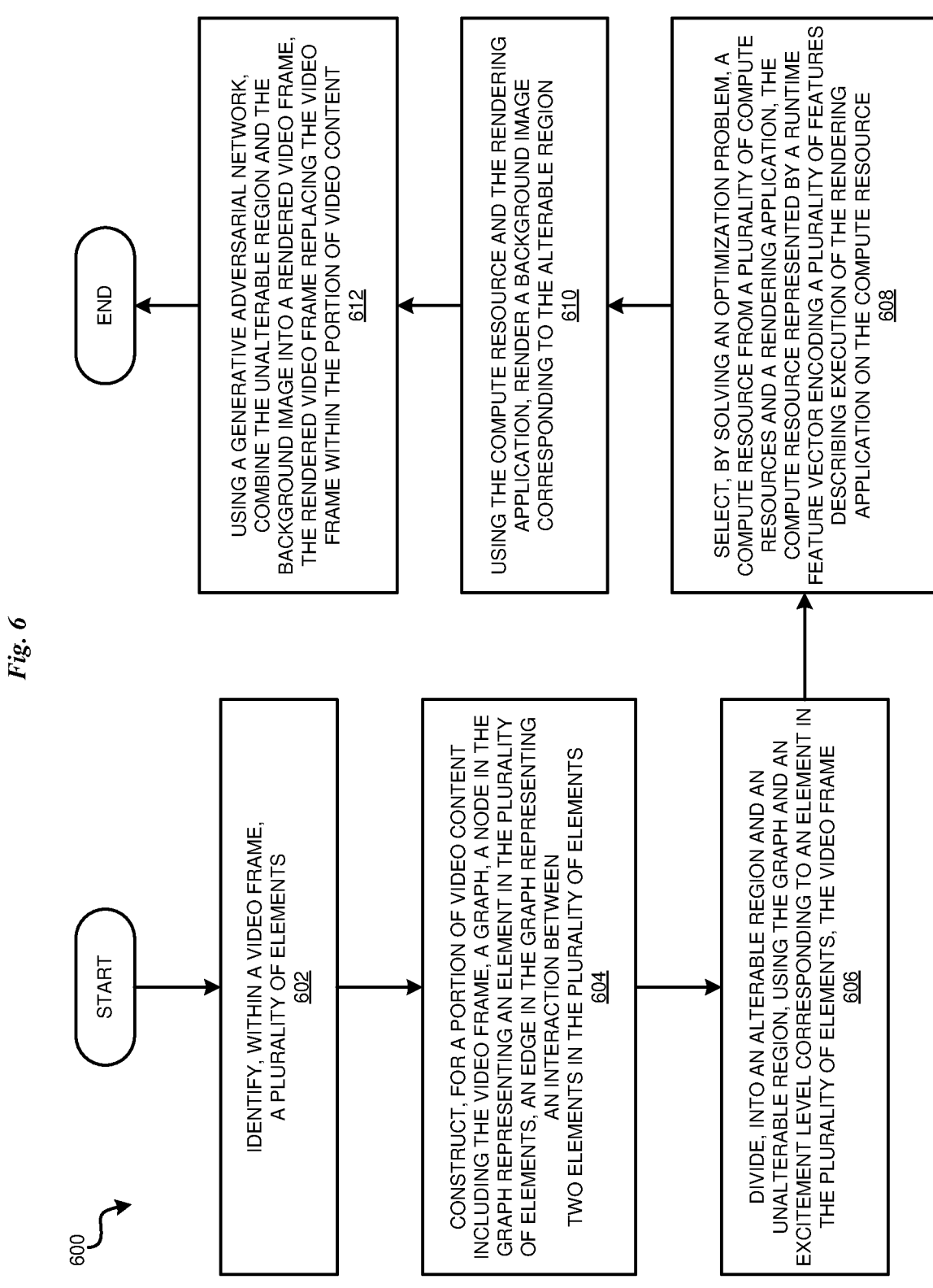
FIG. 6 depicts a flowchart of an example process for dynamic resource constraint based selective image rendering in accordance with an illustrative embodiment.

With reference to FIG. 6, this figure depicts a flowchart of an example process for dynamic resource constraint based selective image rendering in accordance with an illustrative embodiment. Process 600 can be implemented in application 200 in FIG. 2.

In block 602, the application identifies, within a video frame, a plurality of elements. In block 604, the application constructs, for a portion of video content including the video frame, a graph, a node in the graph representing an element in the plurality of elements, an edge in the graph representing an interaction between two elements in the plurality of elements. In block 606, the application divides, into an alterable region and an unalterable region, using the graph and an excitement level corresponding to an element in the plurality of elements, the video frame. In block 608, the application selects, by solving an optimization problem, a compute resource from a plurality of compute resources and a rendering application, the compute resource represented by a runtime feature vector encoding a plurality of features describing execution of the rendering application on the compute resource. In block 610, the application uses the compute resource and the rendering application, render a background image corresponding to the alterable region. In block 612, the application, using a generative adversarial network, combines the unalterable region and the background image into a rendered video frame, the rendered video frame replacing the video frame within the portion of video content. Then the application ends.

Thus, a computer implemented method, system or apparatus, and computer program product are provided in the illustrative embodiments for dynamic resource constraint based selective image rendering and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:

identifying, within a video frame, a plurality of elements;

constructing, for a portion of video content including the video frame, a graph, a node in the graph representing an element in the plurality of elements, an edge in the graph representing an interaction between two elements in the plurality of elements;

dividing, into an alterable region and an unalterable region, using the graph and an excitement level corresponding to an element in the plurality of elements, the video frame;

selecting, by solving an optimization problem, a compute resource and a rendering application, the compute resource represented by a runtime feature vector encoding a plurality of features describing execution of the rendering application on the compute resource;

rendering, using the compute resource and the rendering application, a background image corresponding to the alterable region; and combining, into a rendered video frame, the unalterable region and the background image, the rendered video frame replacing the video frame within the portion of video content.

2. The computer-implemented method of claim 1, further comprising:

encoding, into a resource feature vector, a plurality of features of the compute resource;

encoding, into a code feature vector, a plurality of features of the rendering application; and generating, using a trained feedforward neural network, from a combination of the resource feature vector and the code feature vector, the runtime feature vector, the runtime feature vector encoding a plurality of features describing execution of the rendering application on the compute resource.

3. The computer-implemented method of claim 1, wherein the compute resource is selected from a plurality of compute resources, each compute resource represented by a corresponding runtime feature vector.

4. The computer-implemented method of claim 1, wherein the rendering application is selected from a plurality of rendering applications, each rendering application represented by a corresponding code feature vector.

5. The computer-implemented method of claim 1, wherein the runtime feature vector is one of a plurality of runtime feature vectors, each runtime feature vector in the plurality of runtime feature vectors generated by a trained feedforward neural network in a plurality of trained feedforward neural networks, the plurality of trained feedforward neural networks configured in parallel with each other.

6. The computer-implemented method of claim 1, wherein the combining is performed using a plurality of generative adversarial networks configured in parallel with each other.

7. The computer-implemented method of claim 1, wherein the combining is performed using a plurality of generative adversarial networks configured in series with each other.

8. A computer program product comprising one or more computer readable storage medium, and program instructions collectively stored on the one or more computer readable storage medium, the program instructions executable by a processor to cause the processor to perform operations comprising:

identifying, within a video frame, a plurality of elements;

constructing, for a portion of video content including the video frame, a graph, a node in the graph representing an element in the plurality of elements, an edge in the graph representing an interaction between two elements in the plurality of elements;

dividing, into an alterable region and an unalterable region, using the graph and an excitement level corresponding to an element in the plurality of elements, the video frame;

selecting, by solving an optimization problem, a compute resource and a rendering application, the compute resource represented by a runtime feature vector encoding a plurality of features describing execution of the rendering application on the compute resource;

rendering, using the compute resource and the rendering application, a background image corresponding to the alterable region; and combining, into a rendered video frame, the unalterable region and the background image, the rendered video frame replacing the video frame within the portion of video content.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

11. The computer program product of claim 8, further comprising:

encoding, into a resource feature vector, a plurality of features of the compute resource;

encoding, into a code feature vector, a plurality of features of the rendering application; and generating, using a trained feedforward neural network, from a combination of the resource feature vector and the code feature vector, the runtime feature vector, the runtime feature vector encoding a plurality of features describing execution of the rendering application on the compute resource.

12. The computer program product of claim 8, wherein the compute resource is selected from a plurality of compute resources, each compute resource represented by a corresponding runtime feature vector.

13. The computer program product of claim 8, wherein the rendering application is selected from a plurality of rendering applications, each rendering application represented by a corresponding code feature vector.

14. The computer program product of claim 8, wherein the runtime feature vector is one of a plurality of runtime feature vectors, each runtime feature vector in the plurality of runtime feature vectors generated by a trained feedforward neural network in a plurality of trained feedforward neural networks, the plurality of trained feedforward neural networks configured in parallel with each other.

15. The computer program product of claim 8, wherein the combining is performed using a plurality of generative adversarial networks configured in parallel with each other.

16. The computer program product of claim 8, wherein the combining is performed using a plurality of generative adversarial networks configured in series with each other.

17. A computer system comprising a processor and one or more computer readable storage media, and program instructions collectively stored on the one or more computer readable storage media, the program instructions executable by the processor to cause the processor to perform operations comprising:

identifying, within a video frame, a plurality of elements;

constructing, for a portion of video content including the video frame, a graph, a node in the graph representing an element in the plurality of elements, an edge in the graph representing an interaction between two elements in the plurality of elements;

dividing, into an alterable region and an unalterable region, using the graph and an excitement level corresponding to an element in the plurality of elements, the video frame;

selecting, by solving an optimization problem, a compute resource and a rendering application, the compute resource represented by a runtime feature vector encoding a plurality of features describing execution of the rendering application on the compute resource;

rendering, using the compute resource and the rendering application, a background image corresponding to the alterable region; and combining, into a rendered video frame, the unalterable region and the background image, the rendered video frame replacing the video frame within the portion of video content.

18. The computer system of claim 17, further comprising:

encoding, into a resource feature vector, a plurality of features of the compute resource;

encoding, into a code feature vector, a plurality of features of the rendering application; and generating, using a trained feedforward neural network, from a combination of the resource feature vector and the code feature vector, the runtime feature vector, the runtime feature vector encoding a plurality of features describing execution of the rendering application on the compute resource.

19. The computer system of claim 17, wherein the compute resource is selected from a plurality of compute resources, each compute resource represented by a corresponding runtime feature vector.

20. The computer system of claim 17, wherein the rendering application is selected from a plurality of rendering applications, each rendering application represented by a corresponding code feature vector.

* * * * *